US006018772A

United States Patent [19]

Kamalski

[11] Patent Number: 6,018,772

[45] Date of Patent: Jan. 25, 2000

[54] SYSTEM FOR TRANSFERRING DATA IN RE-ASSIGNABLE GROUPS, A TRANSMITTER AND A RECEIVER FOR USE IN SUCH A SYSTEM, AND A METHOD FOR TRANSFERRING, TRANSMITTING AND RECEIVING SUCH DATA, AND A SIGNAL COMPRISING SUCH DATA

[75] Inventor: Theodor I. E. Kamalski, Eindhoven, Netherlands

[73] Assignee: U.S. Philips Corporation, New York, N.Y.

[21] Appl. No.: 08/735,166

[22] Filed: Oct. 22, 1996

[30] Foreign Application Priority Data

Oct. 24, 1995 [EP] European Pat. Off. .............. 95202868

[51] Int. Cl.[7] .............................. G06F 15/16

[52] U.S. Cl. .............................. 709/236; 710/33

[58] Field of Search .............................. 395/200.66, 850, 395/853; 709/236; 710/30, 33

[56] References Cited

U.S. PATENT DOCUMENTS

| | | | |
|---|---|---|---|
| 5,392,283 | 2/1995 | Bocci et al. | 370/329 |
| 5,426,735 | 6/1995 | Shibata et al. | 395/200.66 |
| 5,544,325 | 8/1996 | Denny et al. | 395/200.66 |
| 5,566,176 | 10/1996 | Chang | 395/200.58 |

OTHER PUBLICATIONS

"Specification of the radio data system (RDS)", EN 50067, Apr. 1992, published by CENELEC, Brussels, Belgium.

"ALERT C" Traffic Message Coding Protocol Proposed Pre–Standard, Nov. 1990, RDS Alert Consortium with the support of CEC in cooperation with EBU, European Conference of Ministers of Transport (ECMT).

*Primary Examiner*—Dung C. Dinh
*Attorney, Agent, or Firm*—Edward W. Goodman

[57] ABSTRACT

A system for transferring data in group, wherein groups have group identifiers for distinguishing groups comprising different data types. A group can be reassigned to carry a different type of data by transmitting in special groups having a predetermined group identifier, group identifiers and data type identifiers for linking respective group identifiers to respective data types. By transmitting a new data type identifier for certain group identifier that particular group is re-assigned to carry a new data type. This allows the use of a group for a plurality of data types, which is especially useful in the Radio Data System.

15 Claims, 4 Drawing Sheets

SYSTEM FOR TRANSFERRING DATA IN RE-ASSIGNABLE GROUPS, A TRANSMITTER AND A RECEIVER FOR USE IN SUCH A SYSTEM, AND A METHOD FOR TRANSFERRING, TRANSMITTING AND RECEIVING SUCH DATA, AND A SIGNAL COMPRISING SUCH DATA

BACKGROUND OF THE INVENTION

1. Field of the Invention

The invention relates to a system for transmitting data in groups from a transmitter to a receiver, the groups being identified by group identifiers.

The invention also relates to a transmitter for transmitting data in groups, the groups being identified by respective group identifiers, the transmitter being arranged for:

arranging data in different groups according to different data types, allocating a group identifier to groups comprising the same data type, transmitting the groups with their respective group identifiers.

The invention further relates to a receiver for receiving data in groups, the groups being identified by respective group identifiers, the receiver being arranged for:

receiving data in a group, processing of the data in the group based on the group identifier of the group.

The invention additionally relates to a method for transferring data in groups from a transmitter to a receiver, the groups being identified by respective group identifiers.

The invention even further relates to a method for transmitting data in groups, the groups being identified by respective group identifiers, the method comprising the steps of:

arranging data in different groups according to different data types, allocating a group identifier to groups comprising the same data type, transmitting the groups with their respective group identifiers.

The invention also relates to a method for receiving data in groups, the groups being identified by respective group identifiers, the method comprising the steps of:

receiving data in a group, processing of the data in the group based on the group identifier of the group.

The invention also relates to a signal comprising a group identifier and a data field.

2. Description of the Related Art

A system, a method and a signal according to the preamble are known from the document "Specification of the radio data system (RDS)", EN50067, April 1992, published by CENELEC, Brussels, Belgium: In the known system, data is transferred in groups of 104 bits, each group having a group identifier, the so-called Group Type Code, comprising 4 bits. The Group Type Code identifies the data in the group. For example, Group Type Code 0 indicates basic tuning and switching information and Group Type Code 2 indicates Radiotext. As the Group Type Code in RDS comprises 4 bits, this means that only 16 fixed data types or services can be transmitted. This number could be increased by increasing the length of the group identifier or Group Type Code, but this would reduce the data capacity of each of the groups.

SUMMARY OF THE INVENTION

An object of the invention is to allow the transmission of more different data types in a system according to the preamble, than can be addressed with the group identifier.

A system according to the invention is characterized in that at least one of said groups, being identified by a predetermined group identifier, comprises linking information for linking a further group identifier to a data type. By linking a data type to a group identifier according to the invention, it is possible for a broadcaster to determine by himself which services or data types can be transferred in the system as he is no longer restricted by a fixed allocation of a data type (or service) to a particular group identifier. By reserving a predetermined group identifier for transferring this linking information, a receiver can determine in an easy way which services or data types are provided by the system. The receiver only has to monitor those groups, being identified by the predetermined group identifier, in order to receive all the linking information relating to the system. A further advantage is now that it is also possible to link one data type to more than one group identifier, thereby increasing the data capacity for that particular data type.

An embodiment of a system according to the invention is characterized in that the linking information comprises a group identifier indicator and a data type identifier for linking the data type identified by the data type identifier to a group identified by the further group identifier, indicated by the group identifier indicator. This is an advantageous implementation for providing the linking information. The use of a group identifier indicator allows less space to be taken if not all group identifiers can be linked to a data type, but only a (limited) selection thereof.

An embodiment of a system according to the invention is characterized in that at least one of said groups, being identified by a predetermined group identifier, comprises a group identifier indicator and a data type identifier for linking a data type identified by the data type identifier to a group identified by a further group identifier, indicated by the group identifier indicator.

An embodiment of a system according to the invention is characterized in that the at least one of said groups also carries a validity indication of the data type identified by the data type identifier in the group, said validity indication being set if the data of the data type is present in a group, identified by the further group identifier, and being reset if the data of the data type is not present in such a group. This allows a broadcaster to multiplex different data types in one group by transmitting linking information of a plurality of data types, all being linked to one group identifier, and associated with each data type a validity indication. Only one data type can be validated at a time, thus allowing a time multiplexing of different data types in one group. Furthermore, through this measure, it is possible to signal to a receiver that the group identified by the further group identifier does or does not momentarily carry data according to the data type identifier. If it does not momentarily carry this data, this means that this data type will be present in the group in the future, for example. In this way, the receiver knows that more than one data type or service is transmitted in this group, albeit only sequentially and not simultaneously.

An embodiment of a system according to the invention is characterized that the linking information comprises a validity indication for validating the link between the further group identifier and the data type identifier. The addition of a validity indication for validating the link allows the linking of more than one data type to one group identifier. By allowing only one link to be valid at a time, a time multiplexing is realized, wherein a clear identification of the data type of the presently transmitted data is possible.

An embodiment of a system according to the invention is characterized in that groups having the predetermined group identifier carrying various linking information are transmitted in a cyclical repetition, wherein at least one of the groups in each cycle carries a cycle reference indication. By cyclically retransmitting the linking information, a receiver will be able to receive this linking information in due time when it starts to receive the groups. The cycle reference indication allows the receiver to determine for instance, when such a cycle starts or ends, and when to process the linking information. Furthermore, the receiver can determine, upon reception of this information, how much memory needs to be allocated for storing all the linking information.

An embodiment of a system according to the invention is characterized in that a group in the cycle comprises an indication of the number of linked pairs of group identifiers and data type identifiers per each cycle. This measure allows a receiver to determine when a new cycle is transmitted, thereby indicating that the receiver has received all the linking information.

An embodiment of a system according to the invention is characterized in that a group in the cycle comprises information signalling the end of the cycle. This allows the receiver to establish in a way different from the one previously mentioned, to determine if it has received all the linking information contained in the table.

An embodiment of a system according to the invention is characterized in that the system is the Radio Data System, a group is an RDS group and the group identifier includes the RDS group type code. The invention is especially useful in the Radio Data System, wherein Group Type Codes used to be reserved for a single data type only. According to the invention, the groups in the RDS can be assigned to carry different data types at different moments, depending on the linking information, which links the Group Type Code to a particular data type identifier. Thus, the number of different data types in RDS is no longer limited by the number of different groups, i.e., the length of the Group Type Code. Furthermore, a broadcaster can choose freely which data types he or she wants to broadcast, without being hindered by a prescribed and fixed selection of data types.

An embodiment of a system according to the invention is characterized in that predetermined group identifier identifies a version A RDS group. By using a version A group for transmitting the linking information, more linking information can be transmitted as a version A group comprises more free bits than a version B group.

An embodiment of a system according to the invention is characterized in that groups having the predetermined group identifier further comprise information as to the version of the group carrying the data. In this way, a particular data type can be assigned to a version A or a version B group. This allows the use of version A groups for different data types or services than the version B groups, even though the version A group has the same Group Type Code as the version B group.

A signal according to the invention is characterized in that the data field comprises linking information for linking a further group identifier to a data type identifier. In the signal there is a group having a group identifier and a data field, which data field comprises linking information for linking a further group identifier with a data type. This linking information can be in the form of a group identifier indicator placed together with a data type identifier in the data field. Thus the group identifier, indicated by the group identifier indicator is linked to the data type, identified by the data type identifier.

An embodiment of the signal according to the invention is characterized in that the linking information comprises a validity indication for validating the link between the further group identifier and the data type identifier. This allows more than one group identifier to be linked to the same data type at the same time. By adding the validity indication, it becomes clear what the data type is of those groups having the further group identifier.

BRIEF DESCRIPTION OF THE DRAWINGS

The above object and features of the present invention will be more apparent from the following description of the preferred embodiments with reference to the drawings, wherein.

DESCRIPTION OF THE PREFERRED EMBODIMENTS

Figure 1:
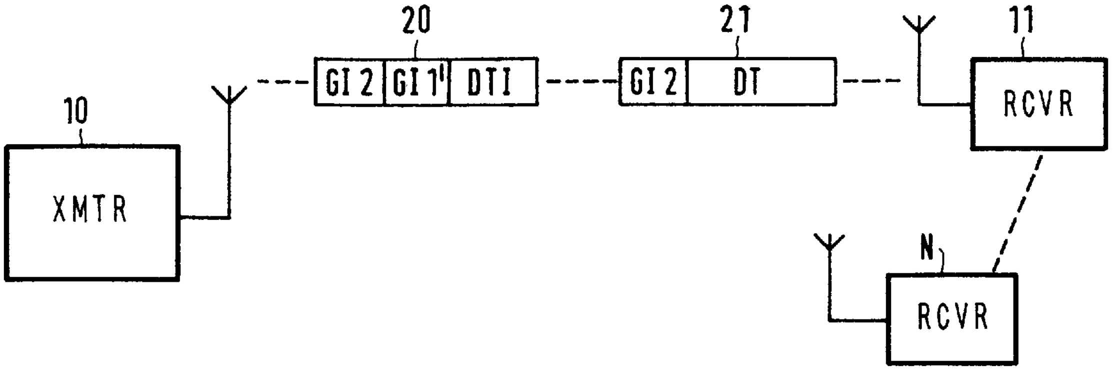
FIG. 1 shows an embodiment of a system according to the invention.

FIG. 1 shows an embodiment of a system according to the invention. In the system, a transmitter 10 transmits data, arranged in groups, each group being identified by a group identifier. The group identifier indicates a data type of the group, identified by that group identifier. The group identifiers are allocated in the transmitter to their respective groups and then transmitted. The system further comprises at least one receiver 11, and possibly a plurality of receivers 11 . . . N, for receiving the groups and deriving the data from the groups. The derived data is then processed according to the data type, indicated by the group identifier of the group, from which the data was derived. In FIG. 1, reference 21 denotes a group as transmitted by the transmitter 10, the group comprising a group identifier GI1 and data DT. The transmitter is further arranged for transmitting a group 20, having a predetermined group identifier GI2, unequal to GI1, and which group carries linking information in the form of a group identifier indicator GI1', indicating group identifier GI1, and a data type identifier DTI1. Thus according to the invention, the linking information links a group identifier, in this example GI1, to a particular data type through the data type identifier DTI1 and the group identifier indicator GI1'. In practice, this group identifier indicator GI1' may be equal to the group identifier GI1 itself, but it is not necessary, as will become clear later. In this way, the group 20 tells the receiver that those groups 21, being identified by the group identifier GI1, carry data of the data type as identified by the data type identifier DTI1. An advantage of this is, that a particular group identifier no longer indicates a fixed data type, carried in the group, but that any data type can be assigned to that particular group identifier. A further advantage is that by transmitting a new group 20, comprising the same further group identifier GI1, but a new data type identifier DTI2, this indicates to a receiver that those groups, being identified by the group identifier GI1, no longer carry data of a data type identified by DTI1, but now carry data of a data type identified by DTI2. A further advantage of such a dynamic allocation of a data type to a group identifier is that this allows a service provider to allocate more than one group identifier to one data type, thereby increasing the data capacity for that particular data type. This can be done momentarily when there is a sudden demand for an increased data capacity. When this demand is over, the groups may be re-assigned to other data types again. An advantage of reserving a predetermined group identifier for transmission of the linking information is, that the receiver 11 only has to monitor those groups, being identified by that predetermined group identifier, for reception of the linking information. In other words, the groups carrying the linking information are now easily recognizable to the receiver.

Now an example of transmission and reception of data of a particular data type, identified by a data type identifier DTI1 will be described. The transmitter 10 determines which group identifier is available for transmission of the data in groups. In the example given, the available group identifier is GI1. The transmitter 10 transmits a group, having a predetermined group identifier GI2, said group comprising the group identifier indicator GI1' and the data type identifier DTI1 as data. Next, the transmitter 10 arranges the data of the particular data type in groups with group identifier GI1, and transmits these groups. The receiver 11 receives the group 20 with group identifier GI2 and retrieves the group identifier GI1 and the associated data type identifier DTI1. If the data type identifier DTI1 matches with a stored data type identifier in the receiver, then the receiver 11 will retrieve the data from received groups 21, having group identifier GI1, and will process the data according to the data type identified by the data type identifier DTI1. If DTI1 does not match a stored data type identifier, then the receiver will skip all the groups having group identifier GI1, as the receiver will not be able to process the data in the groups.

An example of a system, where the invention is of particular advantage, is the Radio Data System as known from the document "Specification of the radio data system (RDS)", EN50067, April 1992, published by CENELEC, Brussels, Belgium. In this system, data is arranged in groups of 104 bits, each group comprising 4 blocks of 26 bits each, whereof 10 bits are reserved for a checkword and offset and 16 bits for data a.o. In the second block, 4 bits are reserved for a Group Type Code, which is the group identifier. Until now, a Group Type Code has been assigned to one particular service or data type only. For example, groups having Group Type Code 0 comprise basic tuning and switching information and groups having Group Type Code 2 carry Radiotext data. Thus, each group carries a fixed service or data type. This allows the transmission of only 16 fixed but different data types or services, without any flexibility as to which data types are transmitted. By transmitting in a group, having a predetermined group identifier or Group Type Code (for example 12), linking information linking a data type to a Group Type Code, a broadcaster can determine which data types or services are transmitted in which groups. Now, the broadcaster is no longer to a fixed number of (16) data types or services, but can make an arbitrary selection of data types (of only 16 data types or services) out of a number of data types, which can exceed the number 16 considerably. By reserving a predetermined Group Type Code (12) for this purpose, a receiver only needs to monitor Group Type Code 12 groups for obtaining the linking information. It would also be possible to provide the linking information, relating to data carried in version A groups, in the respective version B groups. However, this would make a receiver more complex as it would have to monitor all version B groups to obtain all the linking information. A further advantage of providing the linking information in a single group type is that now the version B groups of the remaining group types can be used freely. In RDS a data type identifier can indicate a data type, for instance belonging to a service or application. This means that the data type identifier could also be called a application identifier. Such an application could be the Traffic Message Channel according to the Alert C protocol, as known from document "Alert C Traffic Message Coding Protocol", Proposed Pre-standard, November 1990. This application then could have its own data type identifier. Thus another data type identifier could be used for identifying a Traffic Message Channel according to the Alert Plus protocol.

Figure 2:
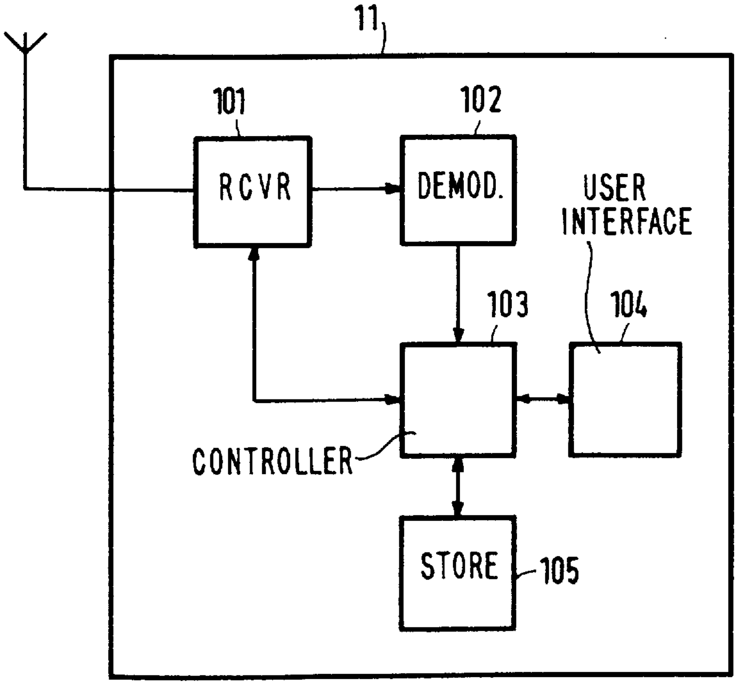
FIG. 2 shows a diagram of an embodiment of a receiver according to the invention.

FIG. 2 shows a diagram of an receiver according to the invention. The receiver 11 comprises receiving means 101 for receiving and demodulating information modulated on a carrier. An output of the receiving means 101 is coupled to a demodulating means 102, for demodulating the data signal, which may be separately modulated on a subcarrier. An output of the demodulating means 102 is coupled to a controller 103 for processing of the demodulated data signal. The controller 103 is coupled to a user interface 104 for receiving commands and displaying auditive and visual information. The controller 103 is also coupled to storing means 105 for storing data. The controller 103 is also coupled to the receiving means 101 for a.o. providing tuning information to the receiving means and receiving information concerning the tuning, for example a tuning indicator for indicating if the receiving means 101 are properly tuned, a reception quality indication etc. However, this is not essential to the invention. The receiver of FIG. 2 is especially suited for receiving a carrier, frequency modulated by a program signal and a data signal, in this case a data signal according to the Radio Data System. The data signal in this system is modulated on a 57 KHz subcarrier.

Figure 3:
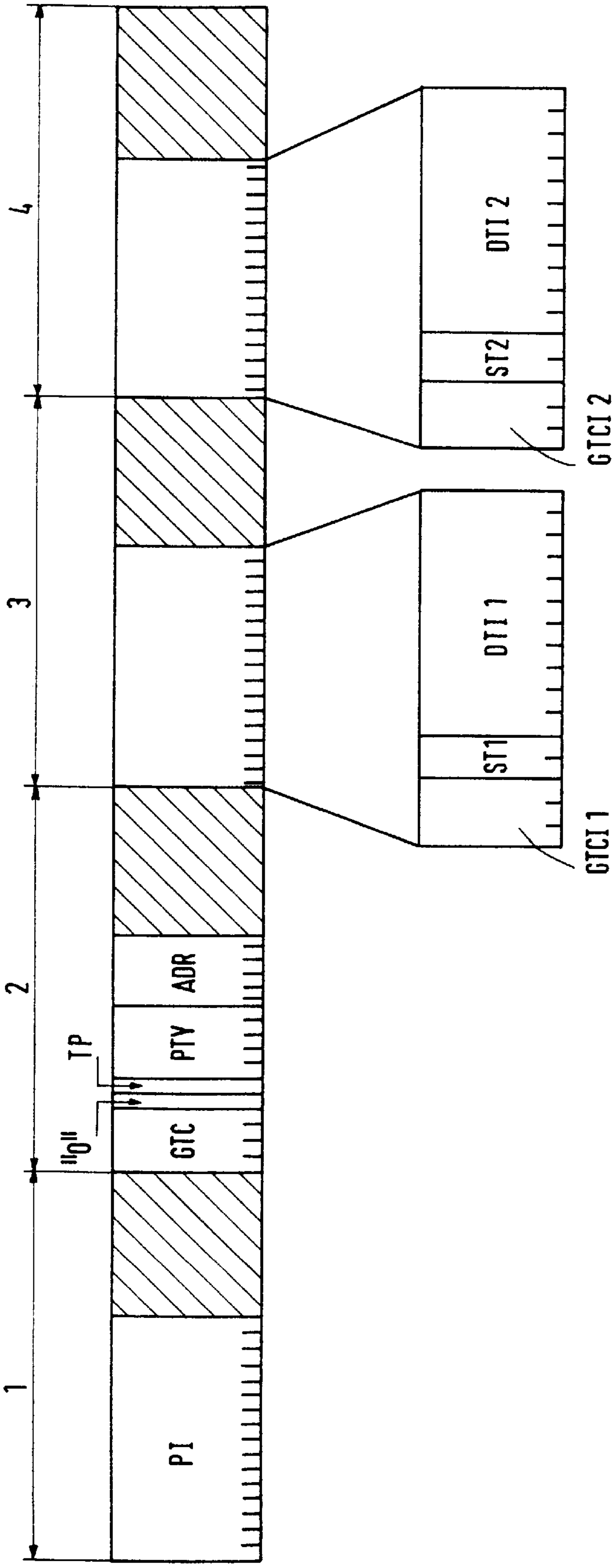
FIG. 3 shows a diagram of an RDS 12A group according to the invention.

FIG. 3 shows a diagram of an RDS 12A group according to the invention. Preferably, the linking information is transmitted in a version A group, as the data capacity of a version A group is 37 bits, whereas the data capacity of a version B group is only 21 bits. The RDS 12A group comprises in the third block 3 a Group Type Code indicator GCI1, preferably comprising only 3 bits, a status indicator SI1, comprising preferably 2 bits and a data type identifier DTI1 of preferably 11 bits. This information will be called a link as the data type identifier DTI1 is now linked to a Group Type Code, indicated by the Group Type Code Indicator GCI1. For compatibility with old receivers, not all group types can be linked freely to a data type. For instance, group 0A comprising basic tuning information is directly processed by the radio and should therefore not be re-assignable. However, group 7A for instance is now reserved for radiopaging, but by setting the appropriate bits in group 1A to zero, indicating that no paging is present. This is already a feature, as known from the mentioned RDS standard. In this way, group 8A can also be re-assigned by not transmitting the slow labelling code in group 1A, pertaining to the TMC channel. This means that preferably only group types 5, 6, 7, 8, 9, 11 and 13 are addressed. For further compatibility it could be allowed to still assign group 8A as TMC channel, being indicated both via the 1A group (slow labelling code) and the 12A group. This comprises only 8 group types, which can be addressed with 3 bits. This explains the length of the Group Type Code Indicator GCI1 and illustrates the use of an indicator, replacing the group identifier itself, as mentioned in conjunction with FIG. 1. For instance, a GCI1-value "000" could indicate Group Type Code 5, a GCI1-value of "001" could indicate Group Type Code 6 etc. The 11 bits for the data type identifier allow a maximum of 2048 different data types to be addressed. The linking information further comprises a validity indication for validating a link between a group identifier and a data type. Here the validity indication takes the shape of a status indicator SI1. This status indication SI1 indicates in which version (A or B) of an RDS group the data is carried, see table 1. Thus it serves as a validity indication, which is set if the data type is present in the group, and reset if it is not present.

TABLE 1

Explanation of Status Indicator.

| Value | Explanation |
|---|---|
| 00 | implemented, momentarily not in use |
| 01 | version A group, momentarily in use |
| 10 | version B group, momentarily in use |
| 11 | version A&B groups, momentarily in use |

The value "00" means that this data type or service is implemented, but not present in the group at the moment. However, it can be present in the future. The value "01" and "10", respectively, mean that the data type is present in the version A or version B group, respectively. The value "11" indicates that the data type or service is present in both group versions. The use of such a Status Indicator (or validity indication) allows a broadcaster to transmit a table with a fixed length. Only when the status or validity of a data type is changed, the corresponding Status Indicator should be changed accordingly. A receiver can make use of this information as follows. When it receives a 12A group, wherein a certain data type is indicated not to be implemented at the moment, the receiver can store the corresponding data type identifier and the PI code and Group Type code associated with the data type identifier, and recall this information on a later date, when the receiver is instructed by a user to retrieve data of that particular data type. Now the receiver already knows where to look for that data. It then checks if the data is actually transmitted, and if so, retrieves that data from the received groups with the correct Group Type Code. The validity indication allows a broadcaster to multiplex different data types in one group by transmitting linking information of a plurality of data types, all being linked to one group identifier, and associated with each data type a validity indication. Only one data type can be validated at a time, thus allowing a time multiplexing of different data types in one group. Furthermore, through this measure it is possible to signal to a receiver that the group identified by the further group identifier does or does not momentarily carry data according to the data type identifier. If it does not momentarily carry this data, this means that this data type will be present in the group in the future, for example. In this way, the receiver knows that more than one data type or service is transmitted in this group, albeit only sequentially and not simultaneously. Of course, this validity indication is not limited to use in the RDS system, but can be applied in any system according to the invention.

In the case of an even number of links, block 4 will comprise also a link, in the same format as in block 3. In the case of an odd number of links, block 4 may be filled with logical zeros. The remaining 5 free bits in block 2 are used for a binary address number ADR. The linking information is transmitted pair-wise (if possible) as illustrated above. When all linking information has been transmitted, this transmission of the linking information is cyclically repeated. Thus, a receiver can at all times start to decode version 12A groups to obtain all the linking information. To indicate the start and/or end of a cycle of such a retransmission, the address number "00000" is reserved as a cycle reference indication for this purpose. If desired, the remaining free bits in the third and fourth blocks of a 12A group, having address number "00000", may include the number of links transmitted in the cycle. This allows a receiver, who receives a 12A group having an address number "00000" to determine the start or end and the length of cycle. Furthermore, if the receiver knows the number of links, it can determine how much memory needs to be allocated for storing all the links. The cyclical transmission of the list of links allows a receiver also to use a kind of error correction by comparing the links of different cycles with each other. If a difference occurs, which can not be contributed to two different links being compared, it is likely that in one of the cycles an error is present. Thus by comparing a plurality of cycles with each other, it is possible to correct for errors. The first 12A group comprising linking information will have address number "00001", the second "00010" etc. When the receiver has received a full cycle, it knows that no more new information is present and it may stop monitoring the 12A groups, as the receiver now has received all the linking information. The above is of course only an illustration of the invention and is not intended to delimit the invention. Other group types than 12A can be chosen for transmitting the linking information and of course another selection of addressable group types can be made. If desired, all group types may be addressed, and, as consequence, the GCI1 should then be 4 bits, in which case perhaps only one link per group can be transmitted. The length of the data type identifier can also be chosen differently. If desired, the linking information may also be transmitted in a version B group, even though the data capacity of a version B group is lower than that of a version A group.

Figure 4:
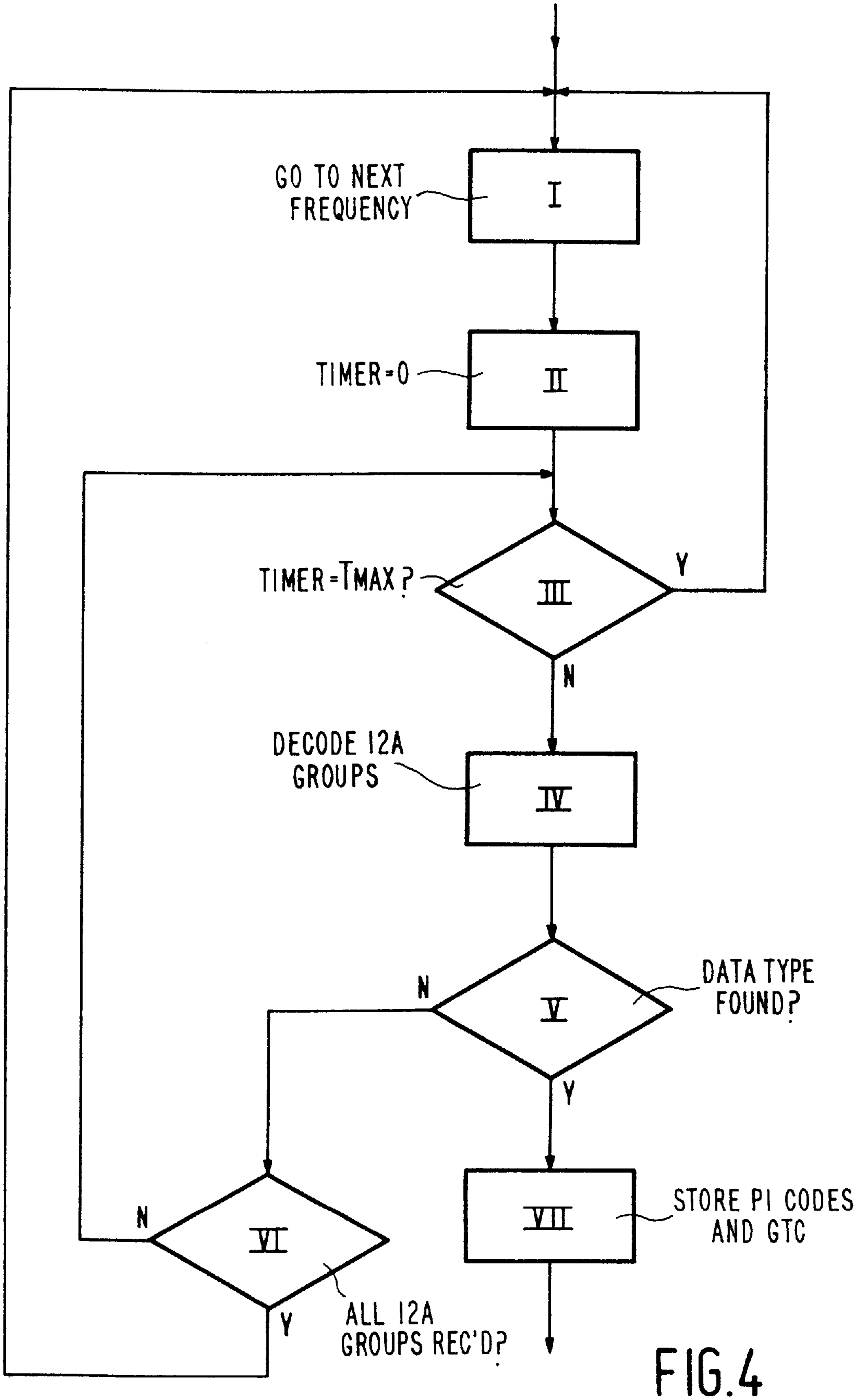
FIG. 4 shows a diagram of a flow chart of processing of 12A groups according to the invention.

FIG. 4 shows a diagram of a flow-chart of processing of 12A groups according to the invention. This flow-chart is an illustration of a search for a desired data type or service in a plurality of receivable programs, received at their respective frequencies. The controller 103 of the receiver 11 of FIG. 2 can carry out the algorithm of the flow-chart. In table 2 a short description is given of each of the blocks in the flow-chart.

TABLE 2

Description of the blocks in FIG. 4.

| Block | Description |
|---|---|
| I | Go to next frequency |
| II | Set timer to zero |
| III | Timer = Tmax? |
| IV | Decode 12A groups |
| V | Wanted data type found? |
| VI | All 12A groups in cycle received? |
| VII | Store PI code and GTC |

In this example, the receiver 11 is assumed to be searching for a program, carrying in the RDS data a wanted data type.

For this purpose, the receiver tunes to a frequency in block I, on which frequency a program is received. If the program does not carry RDS data, the receiver tunes to a frequency on which it receives a program carrying RDS data. This goes on until a program has been found, which carries RDS data. Then it resets a timer to zero in block II. In block III the receiver checks if the timer has reached a value Tmax. As the answer is no (the timer has just been reset), the algorithm in block IV starts to decode RDS 12A groups. Then in block V, the decoded data type identifiers from the 12A groups are compared with the wanted data type identifier. If one of the data type identifiers matches the wanted data type identifier, then in block VII the PI code of the presently received program is stored, together with the Group Type Code indicated by the Group Type Code indicator, associated with the data type identifier and, consequently, the search is ended. If none of the decoded data type identifiers matches the wanted data type identifier, then in block VI it is checked if all linking information (i.e. all 12A groups in a cycle) have been received. This can be checked with the aid of the address number "00000" in one of the 12A groups and the number of links as indicated in the remainder of said group, or by twice detecting the address number "00000", which indicates the begin of a new and the end of an old cycle. If not all information has been received, the algorithm returns to block III. If now the timer has reached the value of Tmax, then the search for the wanted data type identifier in the presently received program is aborted, and the algorithm returns to block I to find a new program. This check limits the amount of time a receiver will try to decode all linking information in one program. Otherwise this could go on endlessly, for instance, if due to reception conditions, a cycle can not be received completely. When the timer has not reached Tmax, the blocks IV and V are repeated, until either in block V the wanted data type identifier has been found, or in block VI a complete cycle has been decoded, i.e. all lining information has been found, or in block III the timer has reached Tmax. If no match has been found in block V, and the algorithm returns from either block VI or III to block I, the receiver searches for a new frequency on which a program carrying RDS data is found, and the algorithm goes through block II etc. This is repeated until no more frequencies can be found or until the wanted data type identifier has been found. Block I can comprise any arbitrary algorithm for tuning the receiver to a frequency different from the previous one. It can be a scan, i.e. the tuning frequency is gradually increased (or decreased) until the receiver is again tuned to a program carrying RDS data. It can also be that the receiver has a list of frequencies stored in memory, and that block I involves the tuning from one of the frequencies in the list to the next frequency in the list. However, this is not essential to the invention.

Figure 5A:
FIGS. 5A–C show a diagram of the possible links according to the invention. In the figures, identical parts are provided with the same reference numbers. In the flow chart, a "Y" means that a condition in a block is met, and an "N" means that a condition in the block is not met.
Figure 5B:
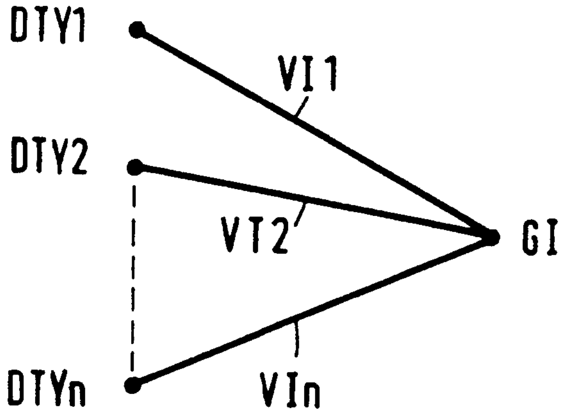
Figure 5C:
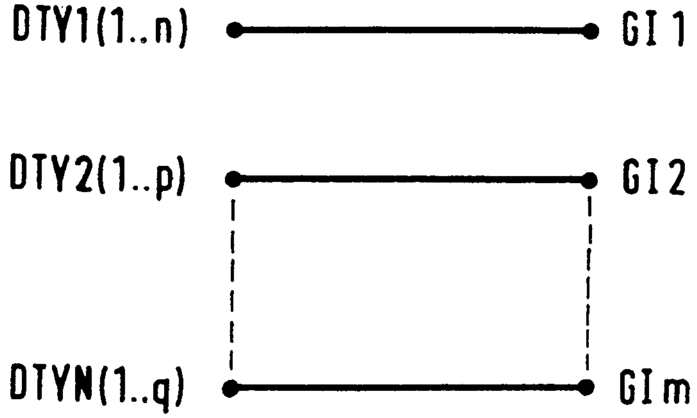

FIG. 5 shows a diagram of the possible links according to the invention. FIG. 5A shows a single link between a group identifier GI and a data type DTY. FIG. 5B shows multiple links. Now a plurality of data types DTY1 . . . DTYn are linked to one group identifier GI. Each of the links has a validity indication VI1 . . . VIn, respectively, for validating only one of the links at a time. FIG. 5C shows a plurality of links from a plurality of data types to a plurality of group identifiers. Thus, group identifier GI1 is linked to data types DTY1(1 . . . n), group identifier GI2 is linked to data types DTY2(1 . . . p), etc. Each single link will have its own validity indication. In the example of RDS, all these links are transmitted in the 12A groups, which thus comprises a list of all the links, whether validated or not.

The invention is not limited for use in the Radio Data System, but can be use in any system, in which data is transmitted in groups, each group being identified by a group identifier and wherein groups carrying the same data have the same group identifier. By linking the group identifier to a data type through a data type identifier, the data type in a group is no longer fixed, but can be chosen at will by choosing a different data type identifier to link with the group identifier. Examples of further systems may be DAB and RDS-like systems, such as HSDS, an FM subcarrier system from Seiko, Japan, mainly intended for paging purposes, and DARC, an FM subcarrier system developed by NHK, Japan and implemented in Japan.

What is claimed is:

1. A system for transmitting data in groups from a transmitter to a receiver, the groups being identified by group identifiers, characterized in that at least one of said groups, being identified by a predetermined group identifier, comprises linking information for linking a further group identifier to a data type, wherein said linking information comprises a group identifier indicator and a data type identifier for linking the data type identified by the data type identifier to a group identified by the further group identifier, indicated by the group identifier indicator.

2. The system for transmitting data as claimed in claim 1, characterized in that the linking information further comprising a validity indication for validating the link between the further group identifier and the data type identifier.

3. The system for transmitting data as claimed in claim 1, characterized in that groups having the predetermined group identifier carrying various linking information are transmitted in a cyclical repetition, wherein at least one of the groups in each cycle carries a cycle reference indication.

4. The system for transmitting data as claimed in claim 3, characterized in that a group in the cycle comprises an indication of the number of linked pairs of group identifiers and data type identifiers per each cycle.

5. The system for transmitting data as claimed in claim 3, characterized in that a group in the cycle comprises information signalling the end of the cycle.

6. The system for transmitting data as claimed claim 1, characterized in that the system is the Radio Data System, a group is an RDS group, and the group identifier includes the RDS group type code.

7. The system for transmitting data as claimed in claim 6, characterized in that the predetermined group identifier identifies a version A RDS group.

8. The system for transmitting data as claimed in claim 6, characterized in that groups having the predetermined group identifier further comprise information as to the version of the group carrying the data.

9. A transmitter for transmitting data in groups, the groups being identified by respective group identifiers, the transmitter comprising:

means for arranging data in different groups according to different data types;

means for allocating a group identifier to groups comprising the same data type; and means for transmitting the groups with their respective group identifiers, characterized in that at least one of said groups, identified by a predetermined group identifier, comprises linking information for linking a further group identifier to a data type, said linking information comprising a group identifier indicator and a data type identifier for linking the data type identified by the data type identifier to a group identified by the further group identifier, indicated by the group identifier indicator.

10. A receiver for receiving data in groups, the groups being identified by respective group identifiers, the receiver comprising:

means for receiving data in groups; and means for processing of the data in each group based on the group identifier of the group, characterized in that at least one of said groups, identified by a predetermined group identifier, comprises linking information for linking a further group identifier to a data type, said linking information comprising a group identifier indicator and a data type identifier for linking the data type identified by the data type identifier to a group identified by the further group identifier, indicated by the group identifier indicator, and the processing means processes the data in a group according to the data type, identified by the data type identifier linked to the group identifier.

11. A method for transferring data in groups from a transmitter to a receiver, the groups being identified by respective group identifiers, characterized in that the method comprises the steps:

inserting linking information for linking a further group identifier to a data type into at least one of said groups identified by a predetermined group identifier; and including, in the linking information, a group identifier indicator and a data type identifier for linking the data type identified by the data type identifier to a group identified by the further group identifier, indicated by the group identifier indicator.

12. A method for transmitting data in groups, the groups being identified by respective group identifiers, the method comprising the steps:

arranging data in different groups according to different data types;

allocating a group identifier to groups comprising the same data type; and transmitting the groups with their respective group identifiers, characterized in that the method further comprises the step:

transmitting at least one of the groups, identified by a predetermined group identifier, with linking information for linking a further group identifier to a data type, said linking information comprising a group identifier indicator and a data type identifier for linking the data type identified by the data type identifier to a group identified by the further group identifier, indicated by the group identifier indicator.

13. A method for receiving data in groups, the groups being identified by respective group identifiers, the method comprising the steps:

receiving data in groups; and processing the data in each group based on the group identifier of the group, characterized in that the method further comprises the step:

receiving at least one of the groups, identified by a predetermined group identifier, with linking information for linking a further group identifier to a data type, said linking information comprising a group identifier indicator and a data type identifier for linking the data type identified by the data type identifier to a group identified by the further group identifier, indicated by the group identifier indicator, and the processing step processes the data in a group according to the data type, identified by the data type identifier linked to the further group identifier.

14. A signal comprising a group identifier and a data field, characterized in that the data field comprises linking information for linking a further group identifier to a data type, wherein the linking information comprises a group identifier indicator and a data type identifier for linking the data type identified by the data type identifier to a group identified by the further group identifier, indicated by the group identifier indicator.

15. The signal of claim 14, characterized in that the linking information further comprises a validity indication for validating the link between the further group identifier and the data type identifier.

* * * * *